Aug. 14, 1928.
F. E. GARBUTT ET AL
DOUBLE PRISM REGISTERING DEVICE
Filed March 10, 1923
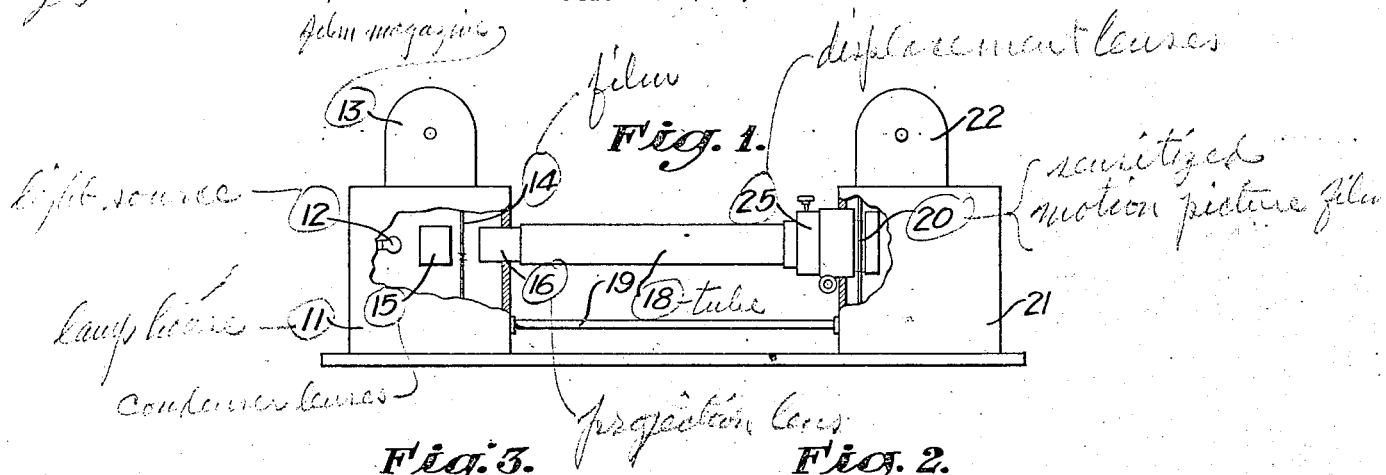
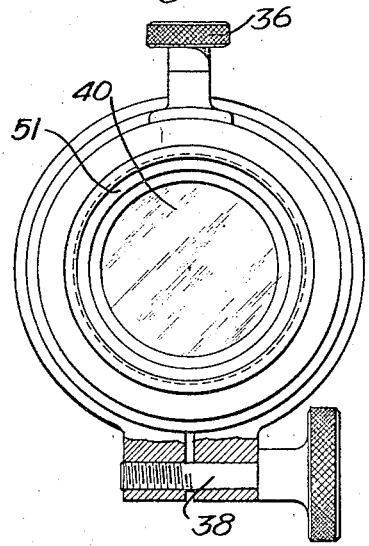
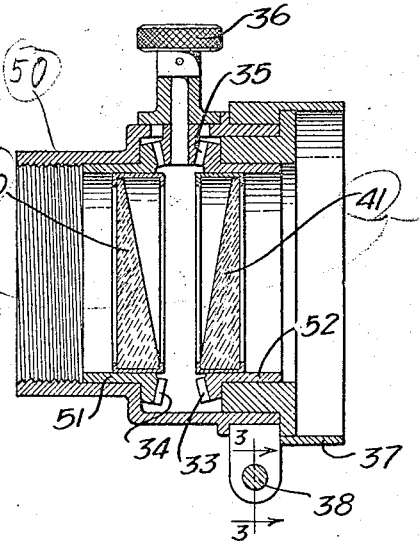
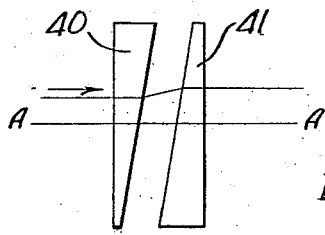
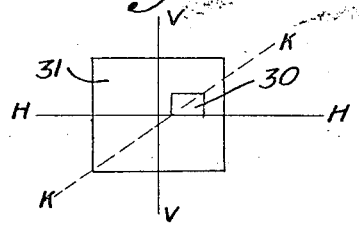
INVENTOR:
FRANK E. GARBUTT,
RALPH G. FEAR,
BY
Graham + Elaine
ATTORNEYS.

Patented Aug. 14, 1928.

1,680,534

UNITED STATES PATENT OFFICE.

FRANK E. GARBUTT AND RALPH G. FEAR, OF LOS ANGELES, CALIFORNIA, ASSIGNORS TO FAMOUS PLAYERS-LASKY CORPORATION, A CORPORATION OF NEW YORK.

DOUBLE PRISM-REGISTERING DEVICE.

Application filed March 10, 1923. Serial No. 624,283.

Our invention relates to the art of reproducing photographs and is particularly applicable to the enlargement of motion picture film, which application will be described in the following specification, without the intention, however, of limiting the invention to this specific application.

In the production of motion pictures it is the ordinary practice to produce a negative in an ordinary motion picture camera which negative is afterwards used to make a positive. Ordinarily the negative is simply reproduced as to size and location of image but occasions arise in which it is desired to enlarge the image of the negative on the positive. Such occasion arises when for example it is desired to bring a portion of the negative up to a larger size for the purpose of rendering objects more visible. This occurs where the camera man has by mistake placed his camera too far away from the action which is to be photographed.

In such cases it is desired to enlarge the negative, printing only a portion thereof upon a positive film. Our invention is equally applicable for reduction purposes.

Further objects and advantages will be made evident hereinafter.

Referring to the drawing which is for illustrative purposes only:

Fig. 1 is a diagrammatic view of a projection printer embodying our invention.

Fig. 2 is a side elevation partly in section of a preferred form of displacement prisms.
Fig. 3 is an elevation partly in section on line 3—3 of Fig. 2.

Fig. 4 is a diagrammatic view of the prisms in one extreme position.

Fig. 5 is a diagrammatic view of the prisms in the other extreme position.

Fig. 6 is a diagram showing the optical fields.

In the form of apparatus illustrated in this drawing, 11 is a lantern house which is provided with a luminous source 12 and with a magazine 13 containing the negative film from which it is desired to produce a positive, this film being shown at 14, passing between a condenser lens system 15 and a projection lens system 16. The image of the film 14 is thrown through a tube 18 on a sensitized photographic motion picture film 20 which passes by the end of the tube 18 beyond the displacement lenses 25. A shaft 19 connects the mechanism in the lamp house 11 with mechanism in the house 21 which house contains the film 20 and a reservoir 22 from which the film is drawn. Suitable mechanism is provided for causing the films 14 and 20 to move in synchronism and for shutting off the light thereon during their movement, the mechanism of such photographic printing apparatus being old in the art and forming no part of the present invention.

If it is desired to enlarge the image of the film 14 as projected on the film 20, this can be accomplished by a suitable manipulation of the projection lens 16, the image being enlarged to any desired degree by such a projection lens. If for example the image is enlarged from the small area 30 to the large area 31 shown in Fig. 6, this may be readily accomplished by the projection lens 16. In the event that the object which it is desired to show is in the center of the film 14, it is simply necessary to manipulate the projection lens 16, thus enlarging the whole frame of negative, only the central portion of which, however, will appear on the positive since the positive frame is of standard motion picture size. It will rarely happen that the object to be enlarged is on the center of the negative film or in other words on the intersection of the axes v—v and h—h of Fig. 6, the image which it is desired to enlarge usually being to one side or the other of these axes, for example, as shown at 30 in Fig. 6. In other words, considering the area 31 as the original negative, the portion of this negative which it is desired to have appear enlarged on the positive is the area 30, it being evident that if this area is to appear on the positive film, the image must be shifted to a sufficient degree to bring the area 30 into a central position at the intersection of the axes v—v, h—h. This is accomplished by the mechanism shown in Figs. 2 and 3, in which 50 is a casing adapted to be secured to the tube 18, this casing containing two rings 51 and 52 which are free to rotate therein, being provided with bevel gears 33 and 34 which engage a bevel pinion 35 on either side. The beveled pinion 35 is turned by means of the thumb nut 36. The casing 50 is secured on the tube 18 by means of a split ring 37 which may be clamped together by means of a screw 38 having a knurled head. The casing 50 may be, therefore, turned about the axis of the tube 18 which is the optical axis of the image projected by the lens 16 which axis passes through the intersection of the lines $v-v$, $h-h$ of Fig. 6.

Mounted in the rings 31 and 32 are prisms 40 and 41, these prisms being of the same angularity, the outer faces thereof being normal to line A—A which represents the optical axis of the tube 18 and the projection lens 16. Owing to the beveled pinion 35 and the beveled gears 33 and 34, the prisms 41 and 42 may be rotated about the axis A—A in opposite directions from the position shown in Fig. 4 into the position shown in Fig. 5. In the position shown in Fig. 4, the lenses 40 and 41 are complementary to each other, the divergence from the optical axis A—A produced by the prism 40 being corrected by the prism 41, the only result being a slight displacement of the image which is readily corrected and which is produced simply by the fact that the two prisms have to be separated a short distance to allow of their rotation. If the two prisms could be placed exactly together, it is obvious that there would be no deflection of the axis A—A at all. When the prisms are turned through 90° they assume the position shown in Fig. 5 in which the divergence from the axis A—A due to the prism 40 is not corrected by the prism 41 but is increased by this prism to an angle equal to the angle P as shown in Fig. 5. In other words, when the prisms are turned into the positions shown in Fig. 5, the direction of the axis A—A of the projected picture is changed, being thrown upwardly as shown in this figure. In other words, the entire image is displaced from the axis $h-h$ along the vertical axis $v-v$. The degree of this displacement depends upon the distance that the prisms are turned from their initial position indicated in Fig. 4. It is, therefore, evident that by turning the thumb screw 36 the whole image can be shifted up or down, providing the original normal position of the prisms was as indicated in Fig. 4, the plane of the paper being considered as vertical.

Since, however, the entire prism system can be turned about the axis A—A by loosening the thumb nut 38, it is evident that not only can the image be thrown vertically, but that by turning both prisms it can be thrown in any direction. If, for example, it is desired to throw the image 30 into a central position on the image 31, the entire lens system is turned so that the initial complementary position is along the line $k-k$ and the thumb screw 36 is then turned until the image 30 which it is desired to shift, moves along the line $k-k$ into a central position on the film. It is thus evident that the degree of displacement of the image is controlled by turning the thumb screw 36 and that the direction in which the image is displaced, is controlled by turning the entire lens system, which can be done by loosening the thumb screw 38. By a combination of these two movements any displacements within the limits of the prisms may be produced and these displacements may be produced in any direction.

We claim as our invention:

1. In a device of the character described: a first element having an image thereon; a second element; and optical means for throwing on any portion of said second element an enlarged reproduction of any portion of the image on said first element, said means comprising a plurality of prisms between said elements, means for changing the angular relationship of one of said prisms to another of said prisms, and means permitting said prisms to be rotated without changing their angular relation to each other.

2. In a device of the character described: a first element having an image thereon; a second element in substantial axial alignment with said first element; and optical means for throwing on any portion of said second element an enlarged reproduction of any portion of the image on said first element, said means comprising a plurality of prisms between said elements, means for changing the angular relationship of one of said prisms to another of said prisms, and means permitting said prisms to be rotated without changing their angular relation to each other.

3. In a device of the character described: a first element having an image thereon; a second element; an intermediate optical system; and means for selectively offsetting the members of said system to throw on any portion of said second element a reproduction of any portion of the image on said first element.

4. In a device of the character described: a first element having an image thereon; a second element; an intermediate optical system; means for selectively radially offsetting the members of said system; and means for selectively varying the circular angularity of such offsetting.

5. A method of transferring any portion of an image from one film to another and varying the scale thereof, which comprises: axially aligning said films; projecting light rays through one of said films and through a scale varying optical system and onto the other of said films and offsetting the members of such projection between said optical system and said other film.

In testimony whereof, we have hereunto set our hands at Los Angeles, California, this 3rd day of March, 1923.

FRANK E. GARBUTT.
RALPH G. FEAR.